United States Patent [19]

Hesler et al.

[11] Patent Number: 5,821,283
[45] Date of Patent: Oct. 13, 1998

[54] INK COMPOSITION AND METHOD FOR PREPARING

[75] Inventors: Carl Michael Hesler, New Egypt, N.J.; Ethan Scott Simon, Ambler, Pa.

[73] Assignee: Rohm and Haas Company, Philadelphia, Pa.

[21] Appl. No.: 724,108

[22] Filed: Sep. 30, 1996

Related U.S. Application Data

[60] Provisional application No. 60/004,951, Oct. 6, 1995.
[51] Int. Cl.$^6$ ...................................................... C09D 5/00
[52] U.S. Cl. .................. 523/161; 106/31.57; 106/31.58; 106/31.59; 106/31.85; 106/31.86; 106/31.87
[58] Field of Search ........................ 523/161; 106/31.57, 106/31.58, 31.59, 31.85, 31.86, 31.89

[56] References Cited

U.S. PATENT DOCUMENTS

| | | | |
|---|---|---|---|
| 4,293,475 | 10/1981 | Sidi | 260/296 |
| 4,916,171 | 4/1990 | Brown et al. | 523/161 |
| 5,296,531 | 3/1994 | Belde et al. | 524/556 |

FOREIGN PATENT DOCUMENTS

| | | |
|---|---|---|
| 53-083809 | 7/1978 | Japan . |
| 704973 | 12/1979 | U.S.S.R. . |
| 1 560 870 | 2/1980 | United Kingdom . |

*Primary Examiner*—Edward J. Cain
*Attorney, Agent, or Firm*—Wendy Choi

[57] ABSTRACT

An ink composition and a method for preparing the ink composition are disclosed. The ink composition provides stability, bleed resistance and lightfastness without requiring the use of a cosolvent. The composition is based on a polymeric dispersant which is compatible with the hydrophobic surfaces of many pigments and which forms a stable dispersion of pigment in an aqueous environment. The ink composition is useful for organic and inorganic pigments.

13 Claims, No Drawings

INK COMPOSITION AND METHOD FOR PREPARING

This is a nonprovisional application of prior pending provisional application Ser. No. 60/004,951, filed Oct. 6, 1995.

The present invention relates to an ink composition. More particularly, the present invention relates to an ink composition having excellent properties of stability, bleed resistance and lightfastness while not requiring the use of a cosolvent.

The ink composition of the present invention is particularly useful in ink jet processes. In ink jet processes, printing is accomplished by spraying ink droplets onto a substrate, such as paper, in a non-impact process by means of a printing head. The ink droplets typically contain a dye, a solvent for the dye, and humectants to prevent the ink from drying on the printing head. It is important that the ink not dry out during use or during storage periods. The ink must also be capable of producing characters of sufficient clarity, optical density and color saturation for the intended application. Several factors affect these properties and the performance of the ink, including the viscosity and surface tension of the ink.

Recent developments in the art have led to increased use of pigment-based inks. A pigment-based ink is a dispersion of pigment in a solution containing a dispersant. Pigment-based inks offer improved light-fastness, water-fastness and print quality over dye-based inks. However, several problems remain with pigment-based inks. Dispersants are required in order to maintain stability of the dispersion of pigment in the solvent. A dispersant also functions in an ink as a binder to fix the pigment to the substrate. Dispersants used with pigments generally must have a hydrophobic portion because the surfaces of many pigments are relatively non-polar. Because common dispersants contain a level of hydrophobic components that makes them insoluble in water, a cosolvent is often required if an aqueous medium is desired for the dispersion.

U.S. Pat. No. 4,597,794 discloses a pigment-based ink which is a dispersion of pigment particles in an aqueous medium containing a polymer having a hydrophilic portion which is less than 40 percent by weight of the polymer, and an aromatic hydrophobic portion which constitutes 60–90 percent of the polymer. According to the disclosure, if the hydrophilic portion exceeds 40 percent, poor dispersion results.

It has been surprisingly found that a polymeric dispersant having as little as 3 percent of an aromatic hydrophobic portion may be used in forming an aqueous dispersion of pigment useful in ink jet processes. A further unexpected result is that a stable aqueous dispersion may be formed using a polymeric dispersant which is formed from up to 45 percent of one or more aromatic hydrophobic monomers, without use of a cosolvent. The aqueous pigment dispersion of the present invention meets the requirements of an ink as to viscosity, particle size, light-fastness, water-fastness, and print quality, and shows no evidence of agglomeration.

According to a first aspect of the present invention there is provided a method for forming an aqueous pigment dispersion by admixing:

1) from 2 percent to 45 percent of one or more pigments;
2) from 0.5 percent to 10 percent of an acrylic polymeric dispersant comprising, as polymerized units:
from 10 percent to 35 percent of an acid-containing monomer, from 40 percent to 80 percent of one or more alkyl acrylic monomers, and from 5 percent to 45 percent of one or more aromatic monomers; and
3) from 45 percent to 95 percent of water.

A second aspect of the present invention is an aqueous pigment dispersion comprising:

1) from 2 percent to 45 percent of one or more pigments;
2) from 0.5 percent to 10 percent of an acrylic polymeric dispersant comprising, as polymerized units:
from 10 percent to 35 percent of an acid-containing monomer, from 40 percent to 80 percent of one or more alkyl acrylic monomers, and from 5 percent to 45 percent of one or more aromatic monomers; and
3) from 45 percent to 95 percent of water.

A further aspect of the present invention is an ink formed from the aqueous pigment dispersion and from 1 weight percent to 30 weight percent of a humectant, based on the total weight of all components in the ink.

The aqueous dispersion of the present invention relies on a polymeric dispersant which improves the water dispersibility of pigments without the need for a cosolvent. The polymeric dispersant is more hydrophilic than conventional polymeric dispersants used for dispersing pigments in ink jet inks.

The polymeric dispersant of the present invention is an acrylic polymer. The acrylic polymer is a copolymer and has an acidic portion, an alkyl portion, and an aromatic portion. The polymer must be sufficiently soluble in water to form a solution in water that is clear to the eye. The polymer must also have a sufficient hydrophobicity to adsorb to a pigment surface and stabilize the resulting dispersion that forms an ink.

A dispersant/binder polymer fulfills several functions, including stabilizing dispersed pigment particles and affixing the colorant to the substrate. To satisfy these functions in aqueous inks, the polymer must balance its affinity for pigment surfaces with its solubility in water. We have found that a quantitative measure of hydrophobicity, the Hansch hydrophobicity parameter, known as the "Hänsch [1] parameter", represented by "[1]", provides a surprisingly useful method of selecting appropriate polymers (C. Hansch, Accounts of Chemical Research, 1969, Volume 2, page 232).

The Hansch hydrophobicity parameter ($^1$) provides an indication of how a molecule will distribute itself between a hydrophilic medium, such as water, and a hydrophobic medium such as, for example, the surface of carbon black. The $^1$ parameter refers to the change in energy when a molecule is transported between water and octanol, a hydrophobic medium. The $^1$ parameter may be negative or positive depending on whether the energy increases or decreases. For example, if the transfer of a molecule from octanol to water is energetically favorable, $^1$ will be negative. The $^1$ parameter is especially useful because the value of $^1$ for a molecule such as a polymer may be estimated by summing the weight average of the $^1$ values for each monomeric unit:

$$\pi = \Sigma(w_i \cdot \pi_i) \qquad i$$

where $w_i$ represents the weight percent of monomeric unit, i, and $\pi_i$ is the hydrophobiicty parameter for monomeric unit, i. Values of $\pi$ for monomers under basic pH conditions, meaning a pH greater than 7, include: methyl methacrylate, 1.89; ethyl methacrylate, 2.43; methacrylic acid, −2.20; acrylic acid, −2.52; styrene, 4.29. Decreasing values of $\pi$ indicate increasing solubility of a molecule in water, and decreasing affinity of the compound for the hydrophobic surface of a pigment; increasing values of $\pi$ indicate decreasing solubility of a molecule in water and increasing affinity for the hydrophobic surface of a pigment. The $^1$ parameters for the polymers used in the examples were calculated using the equation above.

Polymers having π values of between 1.0 and 2.4, preferably between 1.3 and 1.9 are particularly well-suited as dispersants. The present invention provides polymeric dispersants having pi parameters within these ranges.

Monomers to form the acidic portion of the acrylic polymer are selected from: carboxyl functional monomers, including ($C_3$–$C_6$) monoethylenically unsaturated monocarboxylic acid; ($C_4$–$C_8$) monoethylenically unsaturated dicarboxylic acids; and anhydrides of ($C_4$–$C_8$) monoethylenically unsaturated cis-dicarboxylic acids. Examples of useful carboxyl functional monomers include: acrylic acid; methacrylic acid; maleic acid; crotonic acid; itaconic acid; mesaconic acid; fumaric acid; citraconic acid; vinylacetic acid; amino acids such as aspartic acid; acryloxypropionic acid; 1,2,3,6-tetrahydrophthalic anhydride; 3,6-epoxy-1,2,3,6-tetrahydrophthalic anhydride; 5-norborene-2,3-dicarboxylic anhydride; bicyclo[2.2.2]-5-octene-2,3-dicarboxylic anhydride; 3-methyl-1,2,6-tetrahydrophthalic anhydride; 2-methyl-1,3,6-tetrahydrophthalic anhydride. Preferably, the acidic component is formed from a ($C_3$–$C_6$) monoethylenically unsaturated monocarboxylic acid monomer. More preferably, the acidic component is formed from acrylic acid or methacrylic acid.

The amount of monomer used to form the acidic portion of the acrylic polymer must be sufficient to provide water solubility for the acrylic polymer. Generally, the acidic portion will be at least 10 percent by weight of the acrylic polymer, preferably from 15 percent to 35 percent, and most preferably 20 percent to 30 percent by weight, based on the total weight of the polymer.

The hydrophobic portion of the acrylic polymer is formed from an aromatic vinyl monomer. Examples of aromatic vinyl monomers useful in forming the acrylic polymer of the present invention include styrene, methyl styrene, vinyl naphthalene, vinyl anthracene. Preferably, the aromatic vinyl monomer is selected from styrene and α-methyl styrene. More preferably, the aromatic vinyl monomer is styrene. The amount of aromatic vinyl monomer is from 1 percent to 35 percent, preferably from 5 percent to 25 percent and most preferably 10 percent by weight, based on the total weight of the polymer.

The alkyl portion of the acrylic polymer may be any alkyl vinyl monomer, such as, for example, ($C_1$–$C_8$) alkyl esters of acrylic and methacrylic acids. These include, for example, methyl acrylate, ethyl acrylate, butyl acrylate, methyl acrylate, methyl methacrylate, ethyl methacrylate, butyl methacrylate, and isobutyl methacrylate. Also useful are acrylonitrile, vinyl acetate, acrylamides, and hydroxyalkyl esters of acrylic and methacrylic acids. Preferably, the alkyl vinyl monomer is selected from the group of alkyl acrylates and alkyl methacrylates, such as for example methyl methacrylate (MMA), ethyl acrylate (EA). More preferably, the alkyl vinyl monomer is MMA. The amount of alkyl vinyl monomer used to form the acrylic polymer is from 40 percent to 80 percent, and preferably 50 percent to 70 percent by weight, based on the weight of the polymer.

The acrylic polymer of the present invention may be formed by conventional polymerization methods known to those skilled in the art. Polymerization methods useful include emulsion, solution, bulk, and step polymerization. U.S. Pat. No. 3,037,952 discloses the emulsion polymerization of acrylate, methacrylate, and acrylic and methacrylic acid monomers discuseed herein.

The molecular weight of the acrylic polymer will affect the viscosity of the dispersion. In general, an increase in molecular weight will increase the viscosity of the dispersion. Too high a viscosity will make the dispersion unsuitable for use in ink jet printing applications. The molecular weight must also be low enough that the polymer acts as an effective dispersant for the pigment. It is preferable that the molecular weight of the acrylic polymer be below 50,000 and more preferably below 25,000. Specific requirements for the molecular weight will be influenced by the composition of the polymer, the composition of the pigment, and the composition and properties of other components of the dispersion. The molecular weight may be controlled during synthesis by the use of chain transfer agents. Examples of chain transfer agents include alkyl mercaptans such as t-dodecyl mercaptans; alcohols such as isopropanol, isobutanol, lauryl alcohol and t-octyl alcohol; carbon tetrachloride; tetrachloroethylene; and trichlorobromoethane. Generally, the amount of chain transfer agent used is up to about 3 percent by weight, based on the total weight of the monomers. Because of the effect of molecular weight on properties of the polymer, and because the polymer is to function as a dispersant, it is preferred that the polymer not be crosslinked.

The acrylic polymer of the present invention is used in combination with other required components to form an aqueous dispersion of a pigment. The other required components include: a pigment, a neutralizing agent, and water. Optional additional components include a defoaming agent. Other materials, such as biocides, may be added, depending upon the intended use and storage. To form an ink, a humectant is added to the dispersion.

The amount of acrylic polymer to be used as the dispersant in the method of the present invention is less than 25 percent by weight, and is preferably from 0.5 percent to 5 percent by weight, based on the total weight of all components in the ink.

The amount of pigment is generally determined by the desired properties of the ink to be made. For example, in a carbon black ink, increasing the amount of carbon black increases the blackness, known in the art as "jetness", of the resulting ink. An indicator of jetness is the optical density of the ink, also known as the "absorbance". The optical density of an ink may be determined by methods known to those skilled in the art. For example, the optical density may be measured using a colorimeter such as a Macbeth CE 7000 colorimeter. Typically, it is preferred that the optical density be above about 1. Generally the amount of pigment used is less than about 10 percent, and is typically from 6 percent to 8 percent by weight based on the total weight of all components of the ink. It is well known to those skilled in the art that too low a pigment:binder ratio will lower the optical density of the ink without any corresponding improvement in stability.

Examples of pigments useful in the method of the present invention include organic pigments such as azo compounds, phthalocyanine pigments, quinacridone pigments, anthraquinone pigments, dioxazine pigments, indigo, thioindigo pigments, perynone pigments, perylene pigments, and isoindolenone. Also useful are inorganic pigments such as carbon black, titanium dioxide, iron oxide, and metal powders.

For a black ink, which is preferred for many applications, the preferred pigment is a carbon black. Several types of carbon blacks are known and are commercially available. Examples of carbon blacks include channel black, furnace black, and lamp black. Carbon black products are available from suppliers such as Columbian Chemicals, Cabot and Degussa.

Pigment particle size must be sufficiently small that pigment particles will not clog the nozzles on the printing device in which the ink is to be used. Typical nozzle openings on thermal ink jet printers are about 40–60 microns in diameter. Preferably, the pigment particle size is from 0.005 to 5 microns, more preferably not more than one micron, and most preferably not more than 0.5 microns.

The amount of defoaming agent in the ink, if used, will typically range from 0.05 percent to 0.5 weight percent, and is more typically 0.1 weight percent. The amount required depends upon the process used for making the dispersion. For example, in processes such as milling, high shear forces are produced, which may lead to a significant amount of foaming. Defoaming agents useful in forming aqueous dispersions of pigments are well known in the art and commercially available. Examples include Surfynol 104H and Surfynol DF-37(Air Products, Allentown, Pa.), and Deefo PI-35 (Ultra Additives, Patterson, N.J.).

A neutralizing agent is required so that the dispersion will be soluble in basic conditions. Preferably, the neutralizing agent is an amine and more preferably, an organic amine. Examples of amines useful in the method of the present invention are ammonia, ethanolamine, diethanolamine, triethanolamine, methylamine, dimethyl amine, trimethyl amine, ethyl amine, diethyl amine, triethyl amine, morpholine, N-methyl morpholine, and 2-amino-1-methyl propanol. The amount of neutralizing agent required will vary, depending on the initial and the desired pH. Generally, a sufficient amount of neutralizing agent should be added to adjust the pH of the dispersion to 8–9.

It is required that a humectant be used in forming the ink from the aqueous dispersion, in order to keep the ink from drying out during application. The amount of humectant used is determined by the properties of the ink and may range from 1 percent to 30 percent, preferably from 5 percent to 15 percent by weight, based on the total weight of all components in the ink, including the aqueous dispersion. Examples of properties affected by the amount of humectant present include the amount of time for which an ink nozzle may be left uncapped before the ink will become dry ("decap time"), and the amount of time required for the ink to dry on a substrate. The amount of humectant required may also be influenced by the ink jet printer in which the ink is to be used. Properties which determine the usefulness of a particular ink in a particular printer are known to those skilled in the art. Examples of commonly used humectants useful in forming the ink are: glycerol, ethanolamine, diethanolamine, and triethanolamine. Although some of the same materials useful as humectants are also useful as neutralizing agents, described above, additional material is required as the humectant.

The remaining portion of the ink is water. The amount of water preferably is from 65 percent to 90 percent by weight, more preferably from 75 percent to 85 percent by weight, based on the total weight of all components of the ink.

In a preferred embodiment of the method of the present invention, an aqueous dispersion is formed by admixing the pigment with the polymeric dispersant, water, and a defoaming agent. If the pH requires adjustment, a neutralizing agent is added. The components are mixed using a high shear mixer, such as a Dispermat. The mixture is then milled using a media mill, such as an Eiger mill, or a ball mill, as is known to those skilled in the art. Milling typically takes about 60 minutes. The mixture at this stage is typically about 30 percent solid material. Water is usually added before the material is pumped out of the mill. This pumping out is called "letdown". The total amount of water in the dispersion after letdown is from about 45 percent to about 95 percent by weight of all components of the dispersion. The humectant is then added to form the ink.

The ink formed by the method of the present invention is not limited to use in a particular printing device, and may be used in any printing device. In particular, the ink is useful in ink jet printing devices, many of which are commercially available and known in the art. An ink jet printing device is typically equipped with a cartridge, which is preferably removable, and which has at least a liquid reservoir for the ink, a jet for releasing the ink, and a means for coupling to the printing device.

The following examples are provided to illustrate the present invention.

The polymers used in the examples were prepared by emulsion polymerization in water, according to the method described in U.S. Pat. No. 3,577,515. Composition and physical data are as follows:

Polymer 1 is 65/25/10 methyl methacrylate (MMA)/ methacrylic acid (MAA)/styrene (Sty) and has a molecular weight of 11,000. Polymer 1 has a Hansch [1] parameter of 1.1.

Polymer 2 is 60/20/20 MMA)/ethyl acrylate (EA)/Sty; molecular weight 38,000. Hansh [1] parameter is 1.6.

Polymer 3 is 26/74 acrylic acid (AA)/Sty of molecular weight 21,000. Hansch [1] parameter is 2.5.

Polymer 4 is 21/32/45/2 MAA/Sty/butyl acryate (BA)/ Itaconic acid of molecular weight 250,000. Hansch pi parameter is 2.3.

Polymer 5 is 18/3/26/53 MAA/Sty/MMA/ethyl acrylate (EA) (molecular weight 60,000). Hansch pi parameter is 1.3.

Deionized water was used in all of the Examples.

EXAMPLE 1

Preparation of Black Ink Using Mogul L Carbon Black Pigment and Dispersant Having 10 Percent Aromatic Portion A black pigment dispersion was prepared in the following manner. A combination of 100.0 grams (g) of water and 7.0 g of a 48% solids solution of Polymer 1 was mixed using a Dispermat FE mixing unit (Byk Gardner, Silver Springs, Md.) set at 500 rpm, and 5.8 g of a 75% aqueous solution of diethanolamine was slowly added. 28.4 g of Mogul L carbon black pigment (Cabot Corp.) was added over approximately 2 minutes. The rate of mixing was slowly increased to 5,000 rpm and 1.07 g of Deefo PI-35 (Ultra Additives, Patterson, N.J.) was added. The mixture was then stirred for 15 minutes at 7000–8000 rpm. This produced a wet-out suspension of carbon black.

The suspension of carbon black was then transferred to an Eiger M-50 media mill (Eiger Machinery, Chicago, Ill.) operating at 2000 rpm. The mill speed was increased to 5,000 rpm and the mixture was recirculated for 60 minutes.

On completion of milling, 215.0 g of water was added to the Eiger mill to dilute the dispersion to a 10% solids solution. The dispersion was removed from the mill and filtered through a series of 3 disposable filter units (Balston, Haverhill, Mass.): first an 8.0 micron, then 2.0 micron, then 0.9 micron.

An ink was made from 360 g of the dispersion by adding 40.0 g of diethylene glycol. The particle size of the ink was measured (Brookhaven BI-90 Nanosizer) at 139 nm.

Fifty grams of the ink was introduced into an empty print cartridge of a Hewlett Packard 560C printer following the recommended procedure provided with the HP refill kit. The filled cartridge was mounted in the printer and the printer was successfully used to print pages of text and graphics. The ink on each page dried before the succeeding page was ejected on top of it by the printer. After drying, the page was held under a stream of water and the ink did not run. By comparison, when this process was repeated using a dye-based ink, the ink did run.

EXAMPLE 2

Preparation of Black Ink Using Monarch 1300 Carbon Black and Dispersant Having 10 Percent Aromatic Portion A pigment dispersion was prepared as in Example 1, using 100.0 g of water, 9.7 g of a 48% solids solution of Polymer 1, 3.1 g of a 75% solids solution of diethanolamine, 18.2 g of Monarch 1300 carbon black (Cabot Corp.) and 1.3 g of Surfynol 104H (Air Products, Allentown, Pa.).

After milling for 60 minutes at 5,000 rpm in the Eiger mill, the mixture was letdown with 109.5 g of water to give the final dispersion.

An ink was made from 236.9 g of the dispersion by adding 13.0 g of poly(ethylene glycol), MW 600 and 10.4 g of diethylene glycol, and printed satisfactorily as in Example 1.

EXAMPLE 3

Preparation of Black Ink Using Degussa FW and Dispersant Having 10 Percent Aromatic Portion A pigment dispersion was prepared in as Example 1, using 50.0 g of water, 7.9 g of a 48% solids solution of Polymer 1, 3.6 g of a 75% solids solution of diethanolamine, 15.0 g of Degussa FW 200 carbon black (Degussa Corp.) and 0.3 g of Deefo 97-3 (Ultra Additives, Patterson, N.J.).

After milling 60 minutes at 5,000 rpm in the Eiger mill the mixture was letdown with 30.35 g of water to give the final dispersion.

An ink was made from 26.8 g of the dispersion by adding 2.7 g of poly(ethylene glycol), MW 600 and 2.2 g of diethylene glycol, and printed as in Example 1.

The particle size of the ink was 130 nm.

EXAMPLE 4

Preparation of Black Ink Using Raven 3500 Carbon Black and Dispersant Having 20 Percent Aromatic Portion (Polymer 2)

A pigment dispersion was prepared in as Example 1, using 80.0 g of water, 18.6 g of a 50% solids solution of Polymer 2, 1.9 g of ammonium hydroxide, 37.5 g of Raven 3500 carbon black (Columbian Chemicals, Atlanta, Ga.) and 0.1 g of Surfynol DF-37 (Air Products, Allentown, Pa.).

After milling 60 minutes at 5,000 rpm in the Eiger mill the mixture was letdown with 96.4 g of water to give the final dispersion.

An ink was made from 50.0 g of the dispersion by adding 5.0 g of poly(ethylene glycol), MW 600 and 4.0 g of diethylene glycol, 41.0 g water and printed as in Example 1. The particle size of the ink was 261 nm.

EXAMPLE 5

Preparation of Black Ink Using Polymer 1 and Raven 3500 Carbon Black, With Ammonia Used As Neutralizing Agent A pigment dispersion was prepared in as Example 1, using 80.0 g of water, 19.5 g of a 48% solids solution of Polymer 1, 2.4 g of ammonium hydroxide, 37.5 g of Raven 3500 carbon black and 0.1 g of Surfynol DF-37 (Air Products, Allentown, Pa.).

After milling 60 minutes at 5,000 rpm in the Eiger mill the mixture was letdown with 95.0 g of water to give the final dispersion.

An ink was made from 50.0 g of the dispersion by adding 5.0 g of poly(ethylene glycol), MW 600 and 4.0 g of diethylene glycol, 41.0 g water and printed as in Example 1. The particle size of the ink was 113 nm.

EXAMPLE 6

Preparation of Back Ink using Polymer 4 and Raven 3500 Carbon Black

The pigment dispersion was mixed in as Example 1, using 90.0 g of water, 19.6 g of a 48% solids solution of Polymer 4, 1.1 g of diethanolamine (Aldrich Chemical Co., Milwaukee, Wis.), 37.5 g of Raven 3500 carbon black (Columbian Chemicals, Atlanta, Ga.) and 0.1 g of Surfynol DF-37 (Air Products, Allentown, Pa.).

After milling 60 minutes at 5000 rpm in the Eiger mill the mixture was letdown with 91.7 g of water to give the final dispersion.

An ink was made from 50.0 g of the dispersion by adding 5.0 g of poly(ethylene glycol), MW 600 and 4.0 g of diethylene glycol, 41.0 g water and printed as in Example 1.

The particle size of the ink was 145 nm.

EXAMPLE 7

Preparation of Black Ink Using Polymer 5 and Raven 3500 Carbon Black

The pigment dispersion was mixed in as Example 1, using 100.0 g of water, 18.9 g of a 49.7% solids solution of Polymer 5, 16.0 g of diethanolamine (Aldrich Chemical Co., Milwaukee, Wis.), 37.5 g of Raven 3500 carbon black (Columbian Chemicals, Atlanta, Ga.) and 0.1 g of Surfynol DF-37 (Air Products, Allentown, Pa.).

After milling 60 minutes at 5000 rpm in the Eiger mill the mixture was letdown with 142.0 g of water to give the final dispersion.

An ink was made from 50.0 g of the dispersion by adding 5.0 g of poly(ethylene glycol), MW 600 and 4.0 g of diethylene glycol, 41.0 g water and printed as in Example 1.

The particle size of the ink was 157 nm.

EXAMPLE 8

Preparation of Black Ink Using Polymer 1 and Phthaloblue Pigment

The pigment dispersion was mixed in as Example 1, using 98.6 g of water, 19.5 g of a 48.0 % solids solution of Polymer 1, 5.3 g of Diethanolamine (Aldrich Chemical Co., Milwaukee, Wis.), 37.5 g of DC 3160, a phthalocyanine blue pigment (Daicolor-Pope, Inc., Clifton, N.J.) and 0.1 g of Surfynol DF-37 (Air Products, Allentown, Pa.).

After milling 60 minutes at 5000 rpm in the Eiger mill the mixture was letdown with 100.0 g of water to give the final dispersion.

An ink was made from 50.0 g of the dispersion by adding 5.0 g of poly(ethylene glycol), MW 600 and 4.0 g of diethylene glycol, 41.0 g water and printed as in Example 1.

The particle size of the ink was 75 nm.

COMPARATIVE EXAMPLE 1

Preparation of Ink Using Polymer Having No Acrylic Portion

A pigment dispersion was prepared in as Example 1, using 75.0 g of water, 46.9 g of a 20% solids solution of Polymer 3, 37.5 g of Raven 3500 carbon black (Columbian Chemicals, Atlanta, Ga.) and 0.1 g of Surfynol DF-37 (Air Products, Allentown, Pa.).

After milling 60 minutes at 5,000 rpm in the Eiger mill the mixture was letdown with 75.0 g of water to give the final dispersion.

An ink was made from 50.0 g of the dispersion by adding 5.0 g of poly(ethylene glycol), MW 600 and 4.0 g of diethylene glycol, and 41.0 g water. The particle size of the ink was 129 nm and the surface tension was 53 dynes/cm. The ink was printed as in Example 1. The ink required a longer drying time than any ink in the above examples, and the print quality was inferior.

What is claimed is:

1. A method for forming an aqueous pigment dispersion by admixing:
   1) from 2 percent to 45 percent of one or more pigments;
   2) from 0.5 percent to 10 percent of a water-soluble acrylic polymeric dispersant comprising, as polymerized units:
      from 10 percent to 35 percent of an acid-containing monomer,
      from 40 percent to 80 percent of one or more alkyl acrylic monomers comprising alkyl acrylates, alkyl methacrylates, acrylonitriles, vinyl acetates, acrylamides, hydroxyalkyl esters of acrylic acids, or hydroxyalkyl esters of methacrylic acids,
      and from 5 percent to 45 percent of one or more aromatic monomers; and
   3) from 45 percent to 95 percent of water.

2. The method of claim 1 further comprising milling said aqueous pigment dispersion.

3. A method for forming an ink comprising admixing from 1 percent to 30 percent by weight of a humectant and from 70 percent to 99 percent by weight of the aqueous pigment dispersion formed according to the method of claim 1, based on the total weight of all components in the ink.

4. An aqueous pigment dispersion comprising:
   1) from 2 percent to 45 percent of one or more pigments;
   2) from 0.5 percent to 10 percent of a water-soluble acrylic polymeric dispersant comprising, as polymerized units:
      from 10 percent to 35 percent of an acid-containing monomer,
      from 40 percent to 80 percent of one or more alkyl acrylic monomers comprising alkyl acrylates, alkyl methacrylates, acrylonitriles, vinyl acetates, acrylamides, hydroxyalkyl esters of acrylic acids, or hydroxyalkyl esters of methacrylic acids,
      and from 5 percent to 45 percent of one or more aromatic monomers; and
   3) the remainder water.

5. The aqueous pigment dispersion of claim 4 wherein the acrylic polymer comprises from 40 percent to 80 percent methyl methacrylate, from 10 percent to 35 percent methacrylic acid, and from 5 percent to 25 percent styrene.

6. The aqueous pigment dispersion of claim 4 wherein the acrylic polymer comprises from 60 percent to 70 percent methyl methacrylate, from 20 percent to 30 percent methacrylic acid, and from 5 percent to 15 percent styrene.

7. The aqueous pigment dispersion of claim 4 wherein the acrylic polymer comprises from 50 percent to 60 percent ethyl acrylate, from 25 percent to 35 percent methyl methacrylate, from 2 percent to 5 percent styrene, and from 10 percent to 20 percent methacrylic acid.

8. An ink comprising from 70 percent by weight to 99 percent by weight of the aqueous pigment dispersion of claim 3, from 1 percent to 30 percent by weight of a humectant, and optionally up to 29 percent by weight of water, based on the total weight of all components in the ink.

9. An ink cartridge comprising:
   1) a liquid reservoir; and
   2) the ink of claim 8.

10. A method for forming an aqueous pigment dispersion for ink jet inks, comprising by admixing:
    1) from 2 percent to 45 percent of one or more pigments having a particle size in the range of from 0.005 to 5.0 microns;
    2) less than 25 percent of a water-soluble acrylic polymeric dispersant comprising, as polymerized units:
       from 10 percent to 35 percent of an acid-containing monomer,
       from 40 percent to 80 percent of one or more alkyl acrylic monomers comprising alkyl acrylates, alkyl methacrylates, acrylonitriles, vinyl acetates, acrylamides, hydroxyalkyl esters of acrylic acids, or hydroxyalkyl esters of methacrylic acids,
       and from 1 percent to 35 percent of one or more aromatic monomers; and
    3) from 45 percent to 95 percent of water.

11. The dispersion of claim 1 or 10 wherein said polymeric dispersant has a Hänsch hydrophobicity parameter ($\pi$) value in the range of from 1.0 to 2.4.

12. An aqueous pigment dispersion for ink jet inks comprising:
    1) from 2 percent to 45 percent of one or more pigments having a particle size in the range of from 0.005 to 5.0 microns;
    2) less than 25 percent of a water-soluble acrylic polymeric dispersant comprising, as polymerized units:
       from 10 percent to 35 percent of an acid-containing monomer,
       from 40 percent to 80 percent of one or more alkyl acrylic monomers comprising alkyl acrylates, alkyl methacrylates, acrylonitriles, vinyl acetates, acrylamides, hydroxyalkyl esters of acrylic acids, or hydroxyalkyl esters of methacrylic acids, and
       from 1 percent to 35 percent of one or more aromatic monomers; and
    3) the remainder water.

13. The dispersion of claim 4 or 12 wherein said polymeric dispersant has a Hänsch hydrophobicity parameter ($\pi$) value in the range of from 1.0 to 2.4.

* * * * *